United States Patent [19]

Tanaka et al.

[11] Patent Number: 4,771,351
[45] Date of Patent: Sep. 13, 1988

[54] DEVICE FOR POSITIONING A SPRING WITHIN A TAPE CASSETTE AND THE SPRING THEREFORE

[75] Inventors: Kimio Tanaka; Takateru Satoh; Haruo Shiba, all of Nagano, Japan

[73] Assignee: TDK Corporation, Japan

[21] Appl. No.: 790,733

[22] Filed: Oct. 24, 1985

[30] Foreign Application Priority Data

Oct. 24, 1984 [JP] Japan .......................... 59-160944[U]
Dec. 15, 1984 [JP] Japan .......................... 59-190232[U]

[51] Int. Cl.⁴ .......................................... G11B 23/087
[52] U.S. Cl. ..................................... 360/132; 242/198
[58] Field of Search .................................. 360/93, 132; 242/197-199; 206/387

[56] References Cited

U.S. PATENT DOCUMENTS 4,484,248 11/1984 Ogiro et al. .......................... 360/132
4,496,119 1/1985 Sieben .................................. 242/198
4,556,153 12/1985 Takagi et al. ..................... 360/132 X
4,572,461 2/1986 Horikawa et al. ................... 242/198
4,576,345 3/1986 Koken et al. ........................ 242/198

FOREIGN PATENT DOCUMENTS 59-203284 11/1984 Japan .................................. 360/132

Primary Examiner—A. J. Heinz
Assistant Examiner—Benjamin E. Urcia
Attorney, Agent, or Firm—Steinberg & Raskin

[57] ABSTRACT

A tape cassette has a case with upper and lower halves and an open space at the front thereof. A magnetic tape housed in the case is wound around a pair of reels. A brake is slidably mounted on the inner surface of the lower half of the case to prevent the reels from being rotated. Part of a spring is attached to the brake. The spring has free ends and urges the brake in a direction. A device for positioning the spring includes a partition wall on the inner surface of the lower half of the case which partitions the open space from the inside of the case. An independent abutment member on the partition wall abuts the free ends of the spring.

16 Claims, 9 Drawing Sheets

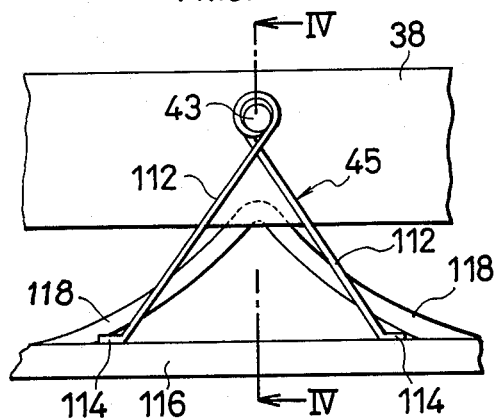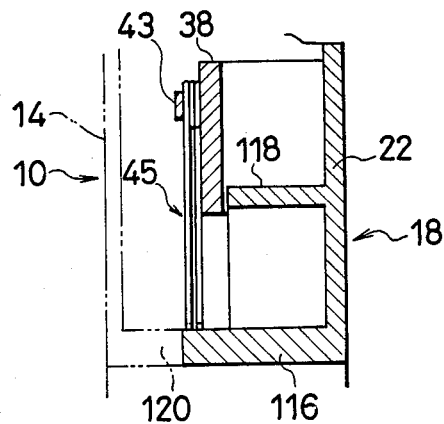

DEVICE FOR POSITIONING A SPRING WITHIN A TAPE CASSETTE AND THE SPRING THEREFORE

BACKGROUND OF THE INVENTION

The present invention relates to an audio or video tape cassette. More particularly, the invention relates to a spring and its support member for applying braking force to a reel brake which slides in the tape cassette.

The audio or video tape cassette in which reels for winding and rewinding a magnetic tape are housed has a reel brake whose stoppers are made operative, when the tape cassette is not used during its transportation or in other cases, to prevent the tape from being loosened because of the idling of the reels. The stoppers of the reel brake are left inoperative when the cassette is used.

SUMMARY OF THE INVENTION

The principal object of the invention is to provide a tape cassette capable of applying stable urging force to the reel brake and of easily adjusting the urging force.

An object of the invention is to provide a tape cassette wherein the free ends of a spring which urges the reel brake in a direction are not disengaged outside.

Another object of the invention is to provide a tape cassette capable of preventing the spring, which urges the reel brake in a direction, from being worn out.

In accordance with the invention, a tape cassette comprises a case including upper and lower halves and having an open space at the front thereof. A magnetic tape housed in the case is wound around a pair of reels. A brake is slidably mounted on the inner surface of the lower half of the case to prevent the reels from being rotated. Part of a spring is attached to the brake. The spring has free ends which urge the brake in a braking direction. A partition wall erected on the inner surface of the lower half of the case partitions the inside of the case from the open space. An independent abutment member located on the partition wall abuts the free ends of the spring.

The spring has a part which is attached to the brake and a loop is formed between the attachment part and the free end of the spring. More particularly, the spring has an attachment portion and is affixed to the brake via the attachment portion, along with having loop portions formed between the attachment portion and the free ends thereof. The attachment portion of the spring has a pair of leg portions, each of the leg portions having a part which is a free end of the spring, with a contact point being situated between each of the leg portions and the attachment portion thereof. Additionally, each of the loop portions is at a corresponding bending section at each contact point.

BRIEF DESCRIPTION OF THE DRAWINGS

For a fuller understanding of the invention, reference is had to the following description, taken in connection with the accompanying drawings, in which:

FIG. 3 is a plan, on an enlarged scale, of the main portion of the tape cassette of FIG. 2;

FIG. 4 is a sectional view, taken along the lines IV—IV, of FIG. 3;

DESCRIPTION OF PREFERRED EMBODIMENTS

Figure 1:
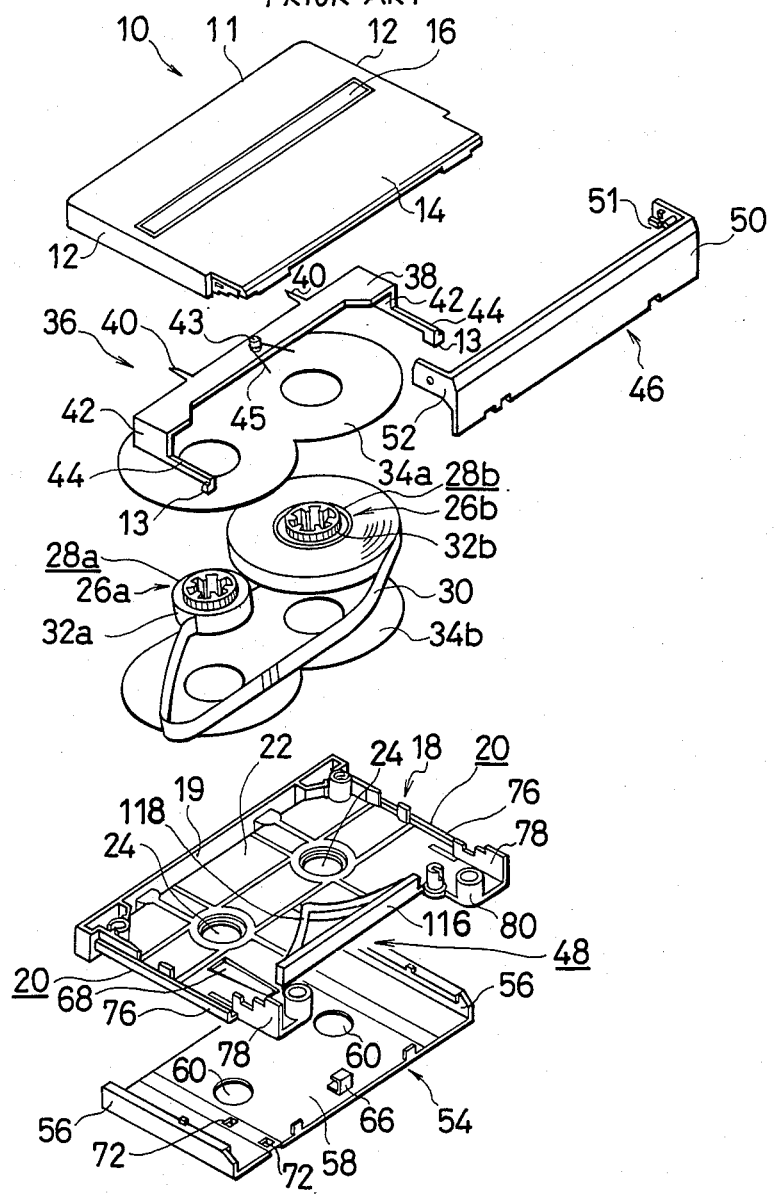
FIG. 1 is an exploded perspective view, of an example of a dismantled conventional tape cassette.

FIG. 1 is a perspective view of an example of a dismantled conventional digital audio tape cassette of tape loading type. The upper half of the tape cassette case 10 includes a back wall 11, side walls 12, 12 extending parallel to each other along both sides of the upper half, and a rectangular top plate 14. A slit window 16 is located in the center of the top plate 14 and extends in the longitudinal direction thereof. The state of the tape wound around the reels in the tape cassette is viewed through the slit window 16.

The lower half 18 of the tape cassette case which includes a back wall 19, side walls 20, 20 extending parallel to each other along both sides of said lower half, and a rectangular bottom plate 22. Openings or holes 24, symmetrical to each other, are provided in the center portion of the bottom plate 22, and shafts for driving the reels are inserted into these openings, respectively. The side and back walls 12, 20, 11, 19 of the upper and lower halves 10 and 18 of the case are substantially the same in height, and when said upper and lower halves are assembled with each other, a housing space is provided between them. Winding and rewinding reels 26a and 26b are housed, symmetrical to each other, in the center portion of the housing space and a magnetic tape 30 is wound around the hubs 28a and 28b, respectively, attached to said reels. Ratchets 32a and 32b are formed at the upper end portions of the hubs, respectively.

Liner sheets 34a and 34b hold the tape-wound reels 26a and 26b between them so as to enable the tape 30 to slide smoothly. A reel brake 36 comprises an elongated plate member 38, a pair of stoppers 40, 40, a pair of bent sections 42, 42, and a pair of legs 44, 44. The plate member 38 is located between the upper half 10 and the upper liner sheet 34a, parallel and adjacent to the inner surface of the top plate 14 of the upper half 10, and extends between the inner surface of both side walls 12 and 12. The stoppers 40, 40 project, parallel to each other, from the longitudinal back wall of the plate member 38 toward the back wall 11 of the upper half 10. The bent sections 42, 42 extend vertically from both ends of the plate member 38 to the inner surface of the bottom plate 22 of the lower half 18. The legs 44, 44 project, parallel to each other, from the bottom ends of the bent sections 42, 42 in a direction opposite to the direction in which the stoppers 40, 40 project. Engaging protrusions 13 extend outward from the front ends of the legs 44, 44, respectively. A spring 45 has a center portion wound around a peg 43 extending upward from the center of the plate member 38, so as to urge the reel brake 36.

A lid 46 covers a front opening 48, formed when the upper and lower halves 10 and 18 of the case are assembled and prevents dust from entering into the reel-housing space in the tape cassette case. A part of a drive means (not shown in the FIGS.) such as, for example, the tape deck, is inserted from the outside into the opening 48. The lid 46 includes an elongated front plate 50 having a portion slightly bent upward, and side wall plates 52, 52 provided at both ends of said front plate. An axle 51 for pivotally affixing the lid 46 to the tape cassette case projects from the inner surface of each of the side wall plates 52. A slider 54 covers the opening 48 from the bottom side of the lower half 18 of the case, so as to prevent the entering of dust. The slider 54 has vertical side walls 56, 56, parallel to each other and of equal height, and a rectangular plate 58 for connecting said side walls.

Openings or holes 60, symmetrical to each other, are provided in the center portion of the plate 58 and the reel drive shafts are inserted through said holes, respectively. When the tape cassette is not used, the slider 54 closes the opening 48, and the reel drive shaft openings 24, 24 at the lower half 18 are covered by part of said slider. When the tape cassette is to be set and used on the drive means, however, the opening 48 is opened and the reel drive shaft openings 60 at the slider 54 are aligned with the openings 24 of the lower half 18, so that the reel drive shafts on the drive means can be inserted into the openings 60 and 24, respectively.

Figure 2:
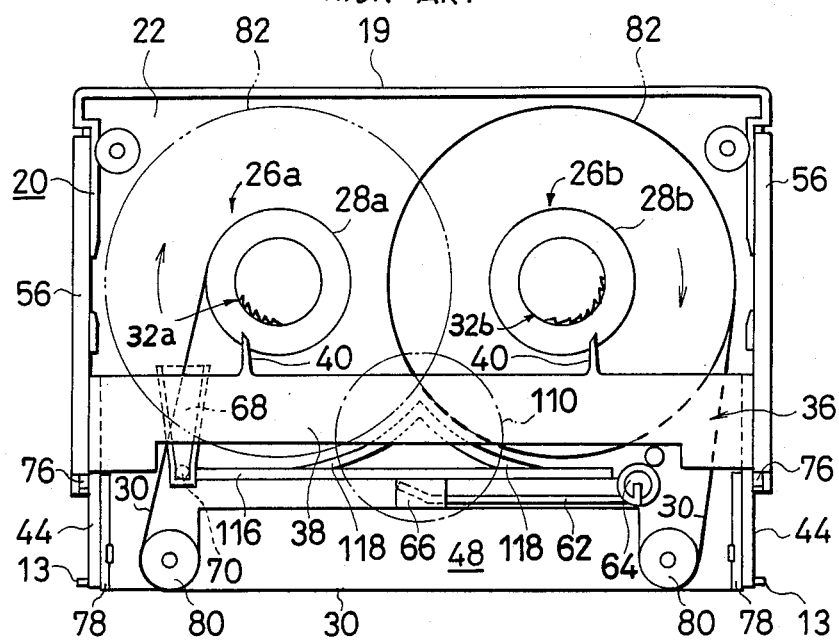
FIG. 2 is a plan, on an enlarged scale, of the tape cassette of FIG. 1, with its upper half removed.

FIG. 2 is a plan showing the known tape cassette with the opening 48 opened. The reel brake 36 slides toward the front of the opening 48, following the movement of the lid 46, to thereby release the reels from it. In FIG. 2, a slider spring 62 has one end fixedly wound around a peg 64 projecting upward from the lower half 18 of the case and the other end is engaged with a spring receiver 66 of the slider 54. The slider spring 62 urges the slider 54 to close the front of the opening 48. An elongated resilient piece 68 formed at a part of the bottom plate 22 of the lower half 18 of the case determines the positions of the front opening of the slider 54 where it is closed and opened. More specifically, a protrusion 70 projects from the front end of the resilient piece 68 toward the slider 54 and engages with one of holes 72, 72 of the plate 58 of said slider to determine the positions of the front opening of said slider where it is closed and opened (FIG. 1). The resilient piece 68 is formed by splitting a part of the bottom plate of the lower half 18 of the case in order to utilize the resiliency of plastics, of which said lower half is made.

Protrusions 13 each project outward from each of the legs 44 of the reel brake 36 and engage with a projection (not shown in the FIGS.) formed on the inner surface of each of the side walls 52 of the lid 46. When the lid 46 is rotated by 90° to partially open the front of the opening 48, the projections are hooked by the engaging protrusions 13 to cause the legs 44 and bent sections 42 of the reel brake 36 to slide on the inner surface of the bottom plate 22 of the lower half 18 of the case toward the front of said opening. As a result, the stoppers 40 projecting from the plate member 38 of the reel brake 36, which is formed integral to the legs 44, are released from the ratchets 32a and 32b of the reel hubs 28a and 28b, thereby permitting the reels 26a and 26b to rotate freely. When the tape cassette is not used, the ratchets 32a and 32b are engaged with the stoppers 40, 40, respectively, thereby preventing the reels 26a and 26b from being rotated.

When force is applied from outside to the reels to wind the tape 30 around one of said reels, however, the reel brake 36 is caused to move a little, following the movement of the reel. Main side walls 76 are formed adjacent the reel brake 36 and outside those portions of the lower half 18 of the case along which said reel brake slides. Sub-side walls 78 are formed adjacent the reel brake 36 and inside those portions of the lower half 18 of the case along which said reel brake slides. The main and sub-side walls form passages along which the reel brake 36 slides and serve to limit the movement of said reel brake in a direction perpendicular to the sliding direction of said reel brake and parallel to the inner surface of the lower half 18 of the case. Tape guides 80 project from the inner surface of the bottom plate of the lower half 18 of the case and are located at both ends of the front of the opening 48. Circles 82 each show the maximum diameter of the tape 30 wound around each of the reels 26a and 26b.

FIG. 3 is a plan showing in detail the portion enclosed by a dot-and-dash line 110 in FIG. 2, and FIG. 4 is a sectional view, taken along the lines IV—IV, of FIG. 3. In FIGS. 3 and 4, the spring 45 has elongated leg portions 112, extending on the left and right sides, respectively, as shown in FIG. 3. Each of the leg portions 112 has a free end 114 at the front end thereof. The spring 45 is symmetrical in relation to the lines IV—IV of FIG. 2. The center portion of the spring 45 is fixedly wound around the column 43 which is located at the center of the plate member 38 of the reel brake 36. The free ends 114 of the spring 45 reach a front side wall 116 and are received by it. As the result, spring force, which is the same on the left and right sides of the lines IV—IV of FIG. 3, is applied to the plate member 38 by the leg portions 112 of the spring 45. The front side wall 116 forms part of a partition wall to partition the opening 48 from the inside of the lower half 18 of the case and serves as a spring receiver wall on which the free ends 114 are supported and slide. A pair of inclined side walls 118, 118 extend from both ends of the front side wall 116 toward the inside of the lower half 18 of the case and combine with each other along the lines IV—IV of FIG. 3. The inclined side walls 118, 118 also form part of the partition wall. The lower half 10 of the case has a front side wall 120. The front end surface of the front side wall 120 is combined with that of the front side wall 116 of the lower half 18 of the case (FIG. 4).

Figure 5:
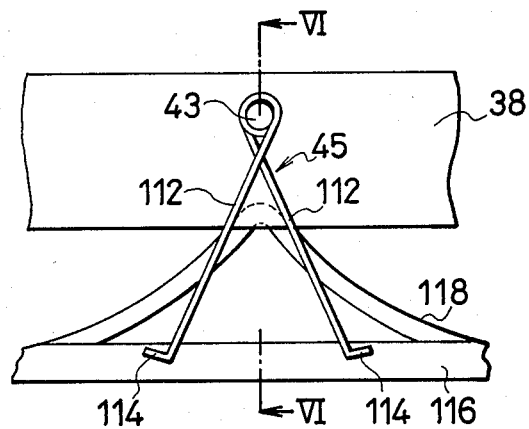
FIG. 5 is a view, on an enlarged scale, of the main portion of the tape cassette of FIG. 2 and illustrates a problem inherent in the conventional tape cassette.
Figure 6:
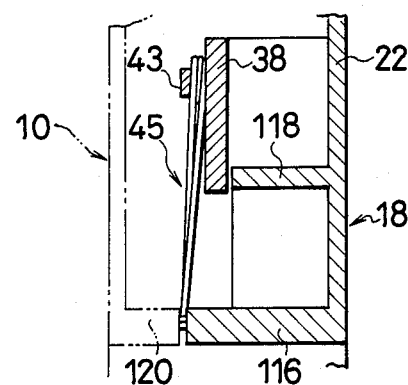
FIG. 6 is a sectional view, taken along the lines VI—VI, of FIG. 5, and illustrates a problem inherent in the conventional tape cassette.
Figure 7:
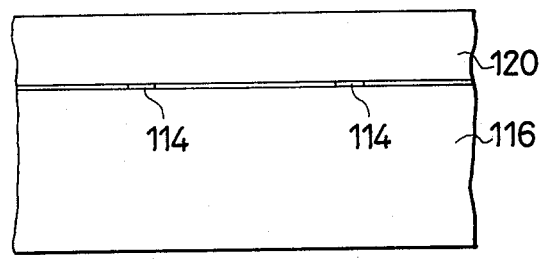
FIG. 7 is a front view, on an enlarged scale, of the tape cassette of FIG. 2 with the upper and lower halves combined and illustrates a problem inherent in the conventional tape cassette.

As hereinbefore described, the position of the spring 45 is considerably one-sided toward the upper half 10 of the case, because of the construction of the reel brake and the position thereof in the tape cassette case. In a case where the free ends 114 of the spring 45 are temporarily received by the front side wall 116 of the lower half 18 of the case and the upper half 10 of said case is then combined with said thus-arranged lower half in the course of incorporating the reel brake into the case, it happens sometimes that said temporarily-received free ends of said spring are disengaged from said front side wall 116 of said lower half, because of their contact with said upper half 10, or the like, in the course of covering said lower half with said upper one 10, and they are sandwiched between the front end surfaces of the front side walls 120 and 116 of the upper and lower halves, as shown in FIGS. 5 to 7. When this happens, the assembly of the case becomes troublesome, the upper half 10 of the case cannot be tightly combined with the lower half 18 of the case and the urging force of the spring is left unstable, thereby making it impossible to generate the desired spring force. Reassembly of the case is therefore necessary to lower the productivity.

Figure 8:
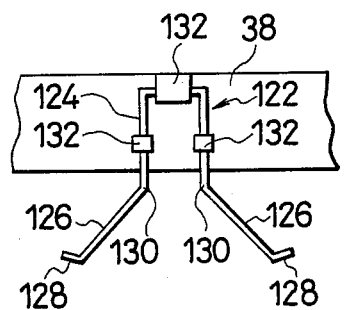
FIG. 8 is a plan, on an enlarged scale, of an example of the conventional spring which urges the reel brake in a direction.

In FIG. 8, a spring 122 is made of an elongated elastic metal wire similar to, but different in shape from, the spring 45 of FIG. 3. The spring 122 has a portion 124 affixed to the plate member 38 of the brake 36, and a pair of leg portions 126 extending from said portion 124. The front ends of the leg portions 126 are formed as free ends 128. Contact points 130, 130 exist between the attachment portion 124 and the leg portions 126, 126. The attachment portion 124 is rectangular, with one open side, formed by bending an elastic metal wire. The attachment portion 124 is fixed at three positions thereof by three catch members 132 formed in the center portion of the plate member 38.

However, the aforementioned spring 122 is worn out, or permanently deformed, when it is used repeatedly, since it is formed only by bending an elongated metal wire symmetrically. The worn-out portion is in the vicinity of the contact points 130, 130, where it is greatly elastically deformed in use. The spring 122 is soon worn out, particularly when it is often used and the difference of its bent angles or the sliding distance of the reel brake 36 is considerable at the time of use and non-use of said brake. In addition, the pressing force of the stoppers 40, 40 is reduced relative to the reel hubs 28a and 28b and the braking force of the reel brake 36 becomes small. As the result, the reels 26a and 26b are likely to be idled to thereby loosen the tape 30.

Figure 9:
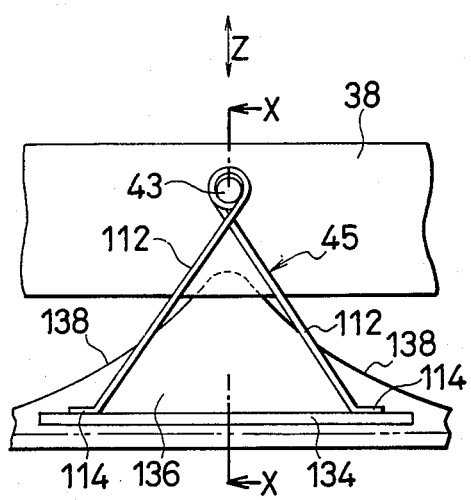
FIG. 9 is a plan, on an enlarged scale, of the main portion of an embodiment of the tape cassette of the invention.
Figure 10:
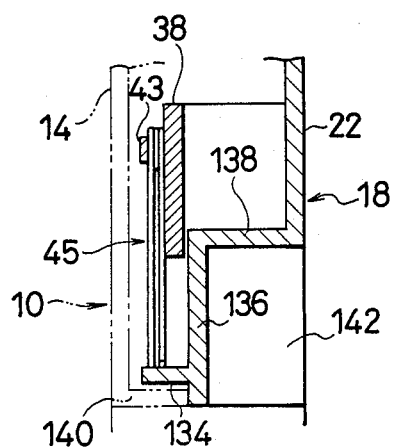
FIG. 10 is a sectional view, taken along the lines X—X, of FIG. 9.
Figure 11:
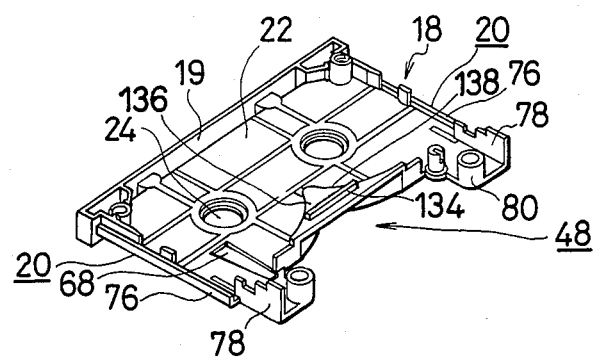
FIG. 11 is a perspective view of part of the embodiment of the tape cassette of FIG. 9.

FIG. 9 is a plan, on an enlarged scale, showing the main portion of an embodiment of the tape cassette of the invention, and FIG. 10 is a sectional view taken along the lines X—X, of FIG. 9. In FIG. 10, part of the upper half 10 of the case is shown by phantom lines. FIG. 11 is a perspective view of an important element of the embodiment of FIGS. 9 and 10 of the tape cassette of the invention.

In FIGS. 9 to 11, an independent abutment wall receives the free ends 114 of the spring 45, which is fixed around the peg 43 on the plate member 38 of the reel brake, which brake moves in directions shown by arrows Z. A plate-like bridge member 136 extends parallel to the inner surface of the lower half 18, from the top end of a partition wall 138, which is on the inner surface of said lower half to partition the inside of the case from the open space 48 thereof, toward said open space 48. The independent abutment wall 134 is located perpendicular to the sliding directions of the reel brake 36, at a position on the surface of the bridge member 136 which extends a bit inward from the front end of said bridge member.

The position, height, shape, and the like, of the independent abutment wall 134 on the bridge member 136 may be appropriately selected, independently of the partition wall 138, so as to be suitable for receiving, supporting and sliding the free ends 114 of the spring 45. Therefore, the accuracy of the position of the independent abutment wall 134 can be easily established to apply stable urging force to the reel brake 36 and the urging force can be adjusted only by selecting the position of said independent abutment wall on the bridge member 136. In addition, the free ends 114 of the spring 45 can be reliably received only by the independent abutment wall 134. Therefore, the free ends 114 of the spring 45 cannot become disengaged from the abutment wall 134 when the upper half 10 of the case is affixed, from above, to the lower half 18 of the case.

When the upper half 10 of the case is attached, from above, to the lower half 18 of the case, as shown in FIG. 10, a partition wall 140 of said upper half 10 is located on the front side of the abutment wall 134 and contacts the surface of the bridge member 136 at the bottom end surface thereof. The partition wall 140 of the upper half 10 of the case and the abutment wall 134 are also held parallel and adjacent to each other when said upper half is combined with the lower half 18 of the case. An inner open space 142 is enclosed by the partition wall 138 of the lower half 18 of the case, the bridge member 136 and the bottom plate 58 of the slider 54, and the spring receiver 66 of said slider 54 is housed in the inner open space 142 when said slider 54 is released. The inner open space 142 therefore functions to enlarge the open space 48 of the case.

Figure 12:
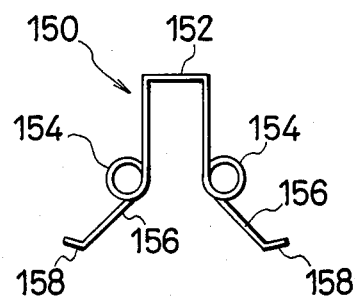
FIG. 12 is a plan, on an enlarged scale, of another embodiment of the spring used by the tape cassette of the invention.

FIG. 12 shows another embodiment of a spring 150 used by the tape cassette of the invention. The spring 150 has an attachment portion 152 which is rectangular, open at one side thereof. This is formed by bending an elongated metal wire which is affixed to the plate member 38 of the brake 36. The spring 150 has loop portions 154, 154 continuous from the attachment portion 152, leg portions 156, 156 continuous from said loop portions, and free ends 158, 158 formed at the front ends of said leg portions, respectively Each loop portion 154 is formed at the contact point between the attachment portion 152 and the leg portion 156.

When the spring 150 is to be made, the number of turns and diameter of the loop portions 154, 154, as well as the material and diameter of the metal wire used are appropriately selected to enable the reel brake to provide the desired braking force. Similarly to the case shown in FIG. 8, it is preferable that the spring 150 be affixed to the plate member 38 of the brake 36 at three points thereof. The loop portions 154, 154 are not fastened down, but left free. Furthermore, the pegs (not shown in the FIGS.) may be provided to extend from the bridge member 136, shown in FIG. 9, and the loop portions 154, 154 may be fitted onto said pegs to more tightly hold the spring 150 and make its operation more stable.

Figure 13:
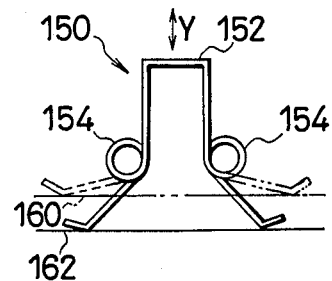
FIG. 13 is a plan of the spring of FIG. 12, and explains how such spring operates.

FIG. 13 shows how the reel brake spring is positioned relative to the independent abutment wall 134 (not shown in FIG. 13) when the tape cassette is used and not used. The spring 150 is repeatedly pressed and loosened in directions Y from a position 162, which shows the tape cassette not in use, to another position 160, which shows the tape cassette in use, and vice versa. As the result, the free ends 158 of the spring 150 are always returned to their original position 162 when the tape cassette is not in use, thereby preventing said spring from being worn out and also preventing a change in the bent angle of said spring. This is because almost all of the elastic change of the spring 150 is absorbed by the change of its loop diameter, caused when its loop portions 154, 154 are twisted.

Figure 14:
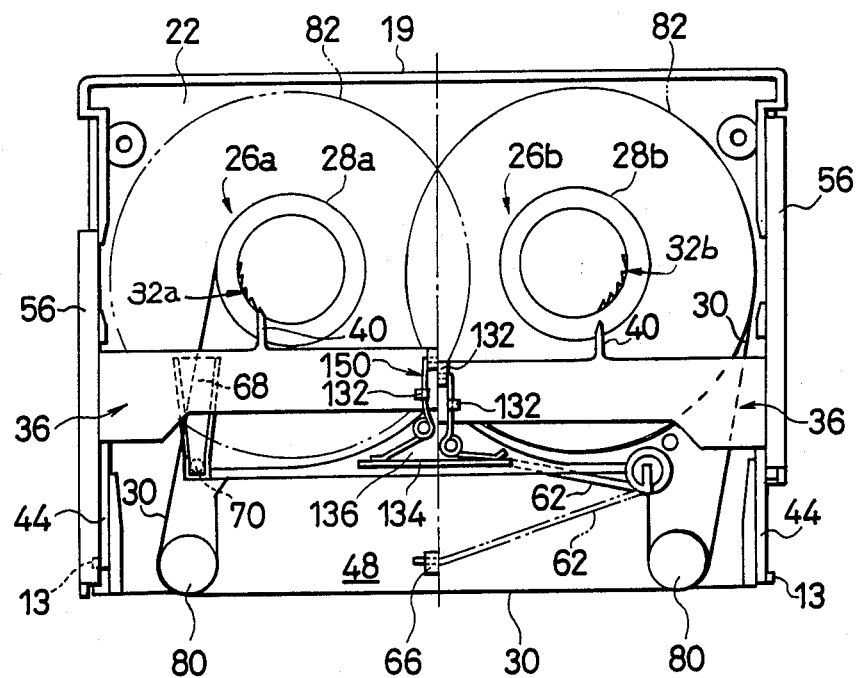
FIG. 14 is a plan, on an enlarged scale, of the tape cassette of the invention, showing the spring of FIG. 12 in a digital audio tape cassette of tape loading type.

FIG. 14 is a plan view showing the spring 150 of FIG. 12 incorporated in the digital audio tape cassette of the tape loading type. The left side of a center line, shown by a dot-and-dash line, shows the tape cassette not in use, while the right side thereof shows the tape cassette in use. As apparent from FIG. 14, the free ends 158, 158 of the spring 150 are received by the independent abutment wall 134.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above-description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tape cassette, comprising
   a casing having an upper portion and a lower portion, said lower casing portion having an inner surface and a recess formed in a front thereof through which a magnetic head is inserted during use,
   a pair of reels housed in said casing, with a magnetic tape being wound thereabout for contact with the inserted magnetic head during use,
   brake means slidably mounted upon the inner surface of said lower casing portion for preventing said reels from rotating,
   spring means for urging said brake means in a braking direction, said spring means being mounted upon said brake means,
   a partition wall situated on the inner surface of said lower casing portion, said partition wall having a top end opposite the inner surface and separating said recess from an interior of said cassette casing in which said reels are housed,
   a bridge member extending substantially parallel to the inner surface from the top end of said partition wall towards the front of said casing, and
   an abutment wall mounted upon said bridge member and extending substantialy perpendicular to a sliding direction of said brake means, and positioned to receive and support said spring means, and
   wherein said abutment wall is positioned upon said bridge member inwardly of a front end of said bridge member, and additionally comprising
   a partition wall mounted upon said upper casing portion and positioned to contact said bridge member between said lower casing portion abutment wall and the front end thereof.

2. The cassette of claim 1, wherein said partition wall extends substantially perpendicular to the inner surface of said lower casing portion.

3. The cassette of claim 1, wherein said abutment wall extends substantially parallel to said partition wall.

4. The cassette of claim 1, wherein said partition walls are substantially parallel.

5. The cassette of claim 1, wherein said spring means are positioned to slide along said abutment wall to urge said brake means in the braking direction when the cassette is not in use.

6. The cassette of claim 1, wherein said partition wall and bridge member further define a recessed cove communicating with the recess formed in the front of said lower casing portion.

7. The cassette of claim 6, additionally comprising
   a lid pivotally mounted upon the front of the casing for covering said recess formed in the front thereof,
   a sliding member mounted underneath said lower casing portion, and covering said front recess from underneath to prevent dust from extending therein,
   a spring receiver mounted upon said sliding member,
   a peg mounted upon a lower surface of said lower casing portion, and
   a slider spring having one end wound about said peg and the other end engaged with said spring receiver,
   with said spring receiver being positioned within said recessed cove when the cassette is in use.

8. The cassette of claim 1, wherein said spring means comprise a pair of free ends abutting against said abutment wall, said spring means being mounted upon said brake means at a section between said free ends thereof,
   with said free ends thereof mounted for sliding movement along said abutment wall to urge said brake means in the braking direction when the cassette is not in use.

9. The cassette of claim 8, wherein said spring means comprise two coils, each said coil situated between said mounting section and one of said ends of said spring means.

10. The cassette of claim 8, wherein said brake means comprise,
    an elongated plate member,
    a pair of stoppers projecting from said plate member, substantially parallel with one another, towards a rear of said casing, and
    a peg extending upwardly from said elongated plate member,
    with said spring means being mounted upon said peg.

11. A tape cassette, comprising
    a casing having an upper portion and a lower portion, said lower casing portion having an inner surface and a recess formed in a front thereof through which a magnetic head is inserted during use,
    a pair of reels housed in said casing, with a magnetic tape being wound thereabout for contact with the inserted magnetic head during use,
    brake means slidably mounted upon the inner surface of said lower casing portion for preventing said reels from rotating,
    spring means for urging said brake means in a braking direction, said spring means being mounted upon said brake means,
    a partition wall situated on the inner surface of said lower casing portion, said partition wall having a top end opposite the inner surface and separating said recess from an interior of said cassette casing in which said reels are housed,
    a bridge member extending substantially parallel to the inner surface from the top end of said partition wall towards the front of said casing, and an abutment wall mounted upon said bridge member and extending substantially perpendicular to a sliding direction of said brake means, and positioned to receive and support said spring means, wherein said spring means comprise a pair of free ends abutting against said abutment wall, said spring means being mounted upon said brake means at a section between said free ends thereof, with said free ends thereof mounted for sliding movement along said abutment wall to urge said brake means in the braking direction when the cassette is not in use, wherein said spring means comprise two coils, each said coil situated between said mounting section and one of said ends of said spring means, and wherein each said coil is substantially 360°.

12. The cassette of claim 9, wherein said mounting section is substantially rectangular and open at one side facing said coils.

13. The cassette of claim 12, wherein said ends of said spring means extend away from one another.

14. A tape cassette, comprising a casing having an upper portion and a lower portion, said lower casing portion having an inner surface and a recess formed in a front thereof through which a magnetic head is inserted during use, a pair of reels housed in said casing, with a magnetic tape being wound thereabout for contact with the inserted magnetic head during use, brake means slidably mounted upon the inner surface of said lower casing portion for preventing said reels from rotating, spring means for urging said brake means in a braking direction, said spring means being mounted upon said brake means, a partition wall situated on the inner surface of said lower casing portion, said partition wall having a top end opposite the inner surface and separating said recess from an interior of said cassette casing in which said reels are housed, a bridge member extending substantially parallel to the inner surface from the top end of said partition wall towards the front of said casing, an abutment wall mounted upon said bridge member and extending substantially perpendicular to a sliding direction of said brake means, and positioned to receive and support said spring means, wherein said spring means comprise a pair of free ends abutting against said abutment wall, said spring means being mounted upon said brake means at a section between said free ends thereof, with said free ends thereof mounted for sliding movement along said abutment wall to urge said brake means in the braking direction when the cassette is not in use, wherein said spring means comprise two coils, each said coil situated between said mounting section and one of said ends of said spring means, and wherein said spring means are affixed to said brake means at three separate points, with said coils remaining unfastened.

15. A tape cassette, comprising a casing having an upper portion and a lower portion, said lower casing portion having an inner surface and a recess formed in a front thereof through which a magnetic head is inserted during use, a pair of reels housed in said casing, with a magnetic tape being wound thereabout for contact with the inserted magnetic head during use, brake means slidably mounted upon the inner surface of said lower casing portion for preventing said reels from rotating, spring means for urging said brake means in a braking direction, said spring means being mounted upon said brake means, a partition wall situated on the inner surface of said lower casing portion, said partition wall having a top end opposite the inner surface and separating said recess from an interior of said cassette casing in which said reels are housed, a bridge member extending substantially parallel to the inner surface from the top end of said partition wall towards the front of said casing, and an abutment wall mounted upon said bridge member and extending substantially perpendicular to a sliding direction of said brake means, and positioned to receive and support said spring means, wherein said spring means comprise a pair of free ends abutting against said abutment wall, said spring means being mounted upon said brake means at a section between said free ends thereof, with said free ends thereof mounted for sliding movement along said abutment wall to urge said brake means in the braking direction when the cassette is not in use, wherein said spring means comprise two coils, each said coil situated between said mounting section and one of said ends of said spring means, and additionally comprising a pair of pegs formed upon said bridge member, with each said coil seated about a respective one of said pegs.

16. A tape cassette, comprising a casing having an upper portion and a lower portion, said lower casing portion having an inner surface and a recess formed in a front thereof through which a magnetic head is inserted during use, a pair of reels housed in said casing, with a magnetic tape being wound thereabout for contact with the inserted magnetic head during use, brake means slidably mounted upon the inner surface of said lower casing portion for preventing said reels from rotating, spring means for urging said brake means in a braking direction, said spring means being mounted upon said brake means, a partition wall situated on the inner surface of said lower casing portion, said partition wall having a top end opposite the inner surface and separating said recess from an interior of said cassette casing in which said reels are housed, a bridge member extending substantially parallel to the inner surface from the top end of said partition wall towards the front end of said casing, and an abutment wall mounted upon said bridge member and extending substantially perpendicular to a sliding direction of said brake means, and positioned to receive and support said spring means, wherein said spring means comprise a pair of free ends abutting against said abutment wall, said spring means being mounted upon said brake means at a section between said free ends thereof, with said free ends thereof mounted for sliding movement along said abutment wall to urge said brake means in the braking direction when the cassette is not in use,
wherein said spring means comprise two coils, each said coil situated between said mounting section and one of said ends of said spring means,
wherein said mounting section is substantially rectangular and open at one side facing said coils,
wherein said ends of said spring means extend away from one another, and
wherein said spring means are positioned within said cassette with said ends thereof spreading away from one another when said brake means are released and when said cassette is in use.

* * * * *